United States Patent
Candea et al.

(10) Patent No.: US 10,229,175 B2
(45) Date of Patent: *Mar. 12, 2019

(54) HIGH-THROUGHPUT EXTRACT-TRANSFORM-LOAD (ETL) OF PROGRAM EVENTS FOR SUBSEQUENT ANALYSIS

(71) Applicant: TERADATA US, INC., Dayton, OH (US)

(72) Inventors: George Candea, Saint-Sulpice (CH); Anastasios Argyros, Allston, MA (US); Mayank Bawa, San Francisco, CA (US)

(73) Assignee: Teradata US, Inc., Dayton, OH (US)

( * ) Notice: Subject to any disclaimer, the term of this patent is extended or adjusted under 35 U.S.C. 154(b) by 877 days.

This patent is subject to a terminal disclaimer.

(21) Appl. No.: 14/482,229

(22) Filed: Sep. 10, 2014

(65) Prior Publication Data

US 2015/0142725 A1    May 21, 2015

Related U.S. Application Data

(63) Continuation of application No. 11/613,036, filed on Dec. 19, 2006, now Pat. No. 8,849,746.

(51) Int. Cl.
*G06F 7/00* (2006.01)
*G06F 17/00* (2006.01)
*G06F 17/30* (2006.01)

(52) U.S. Cl.
CPC .............................. *G06F 17/30563* (2013.01)

(58) Field of Classification Search
CPC ................................................. G06F 17/30563
USPC .......................................................... 707/602
See application file for complete search history.

(56) References Cited

U.S. PATENT DOCUMENTS

| | | | | |
|---|---|---|---|---|
| 7,127,520 | B2 * | 10/2006 | Ladd | H04L 29/06 709/231 |
| 7,487,201 | B1 * | 2/2009 | Murray | G06F 17/30893 709/201 |
| 7,634,477 | B2 * | 12/2009 | Hinshaw | G06F 17/30477 |
| 2002/0010804 | A1 * | 1/2002 | Sanghvi | G06F 9/542 719/318 |
| 2003/0084349 | A1 * | 5/2003 | Friedrichs | G06F 21/55 726/22 |
| 2003/0231647 | A1 * | 12/2003 | Petrovykh | H04L 51/00 370/429 |
| 2005/0071218 | A1 * | 3/2005 | Lin | G06Q 30/00 705/14.44 |
| 2005/0166187 | A1 * | 7/2005 | Das | G06F 9/546 717/136 |
| 2006/0085743 | A1 * | 4/2006 | Baudisch | G06F 17/212 715/273 |
| 2006/0136880 | A1 * | 6/2006 | Sone | G06F 8/41 717/136 |

(Continued)

*Primary Examiner* — Binh V Ho
(74) *Attorney, Agent, or Firm* — Ramin Mahboubian

(57) ABSTRACT

An event tap associated with a server, such as a Web server, at a machine can transform a server event into a tuple, select a database node for the tuple, and place the tuple in a queue for that database node, and then flush the queue periodically directly into database notes. The use of an event tap can thus reduce the computational burden on the database while keeping the server event data in the database relatively fresh.

13 Claims, 6 Drawing Sheets

(56) References Cited

U.S. PATENT DOCUMENTS

2006/0248451 A1* 11/2006 Szyperski ................ G06F 8/00
  715/209
2007/0005610 A1*  1/2007 Gehman ................ G06F 9/542
2007/0192325 A1*  8/2007 Morris .................... H04L 67/24
2008/0066082 A1*  3/2008 Choi ................... H04L 67/1002
  719/318

* cited by examiner

# HIGH-THROUGHPUT EXTRACT-TRANSFORM-LOAD (ETL) OF PROGRAM EVENTS FOR SUBSEQUENT ANALYSIS

CROSS REFERENCE TO RELATED APPLICATION

This application is a Continuation of U.S. patent application Ser. No. 11/613,036, entitled "HIGH-THROUGHPUT EXTRACT-TRANSFORM-LOAD (ETL) OF PROGRAM EVENTS FOR SUBSEQUENT ANALYSIS," filed on Dec. 19, 2006, by George Candea. Anastasios Argyros, and Mayank Bawa.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to extracting program events from running programs and placing a record of these events in a database for subsequent processing.

BACKGROUND

Extracting program events from running programs and placing a record of these events in a database for subsequent processing can be particularly difficult when the events occur at a very high rate.

The running program can be of any type. An example is a server (such as a Web server) that processes requests from clients. Events can be the arrival of such requests, as well the completion of the servicing of requests. Events could be anything else, such as a failure being encountered, a change of condition in system resource availability, etc.

For example, consider a large Internet service that uses a farm of Web servers to expose their content to end users. Such Web farms can have hundreds or thousands of individual Web servers. Every time a user views a particular page, an event is triggered. Such an Internet service would like to record these events, in order to analyze them (also known as clickstream analysis).

Moreover, if additional attributes are recorded along with the event, then the quality of the analysis can increase. Analyzing clickstreams can convey extremely valuable information that can be used in determining user demographics and preferences, tracking usage metrics for products and marketing campaigns by various attributes (type, country, etc.). Executives can track growth trends for the Web site as a whole, while individual business units can drill down and track their specific programs and products on predefined user segments. For such analysis to be effective, additional information must be recorded with each click (e.g., information about the user, how long the processing took, etc.)

Several approaches have been proposed to solve this challenge. For example, the logs generated by the server of interest (e.g., the Web server) can be harvested and processed. Another approach is to instrument the responses returned to end users in a way that will cause the Web browsers of those end users to automatically report events (e.g., tagging Web pages with active code). And finally, there is the approach of extracting the events directly from the running server.

In the log-processing approach, logging is turned on in the server (such as a Web server, application server, database server, any other kind of server) and the resulting logs are then collected. These logs are then parsed and interpreted, and either deposited in a database or some other form of repository. The process of taking these logs and placing them into a repository is often called ETL (Extract-Transform-Load).

One drawback of the server-processing approach is that it can lead to the data in the database being insufficiently current for the data analytics. For example, it may take a significant period of time for the logs to be obtained and processed: during this time, the data in the logs will be unavailable for analysis and the value of the data reduces as its freshness drops.

Conventional Web analytics companies often use a "Web beacon" technique to capture traffic data (formerly known as the "Web bug" approach). This approach requires modifying the production code of a Web property to insert into the Web pages of interest a small 1×1 pixel image or some JavaScript code that carries information about the particular page view. The URL of the pixel (or the JavaScript) points to the servers of the Web analytics company, where information about the initial request is logged. The analysis of the logged data happens through online interfaces that generate Web analytics reports.

Although the above model is currently used at many small and medium size Web sites, it presents significant limitations for use in large scale environments that have stringent requirements for freshness, availability, and visibility into user behavior. Conventional Web analytics companies often struggle at top Web properties; loading and analyzing the clickstream data can become unacceptably slow, the amount of history is often small and customers have to compromise either data detail or time horizon. The end result is that large scale Web analytics become very expensive due to the nonlinear increase in the cost of these systems, reaching many millions of dollars per year for a large site.

The problem here is that, on one hand, there is increased inefficiency in the event collection process: for the event to be recorded, some information is embedded in the result sent to the end user; the end user then automatically acts on that information and sends information to yet another service (in some sense, another event). Typically, a browser automatically fetches the Web beacon and generates an HTTP request to the Web analytics service provider, which then records it. This costs time, processing power, and network bandwidth.

Another fundamental limitation of Web beacons is that they cannot capture requests for non-HTML content, such as images, streaming media, PDF's, etc. With media content becoming increasingly more important for Web properties, this limitation has a serious impact on the value of the analytics solution.

The direct event extraction approach can consist of placing a special piece of code in the server that witnesses the various events, and then extracting the event directly from there to the target repository.

The main challenge in direct event extraction is that the database on the receiving end of these events must be able to sustain the high rates at which events are generated. For example, a service with 3,000 Web servers can receive 3,000,000 clicks per second at peak time, which means that at least 3,000,000 events must be extracted and inserted into a database every second. If only 1 KB of data is collected for each click, then aggregate data bandwidth will exceed 3 Gigabytes/sec. In this example, a database would have to be capable of performing an impractical 3,000,000 transactions per second if each event were directly provided to the database.

SUMMARY

Embodiments of the present invention can use event taps at a server to transform, buffer and load server events into a database in an efficient manner. This can reduce the burden on the database while keeping the server event data in the database relatively fresh.

DETAILED DESCRIPTION

Figure 1:
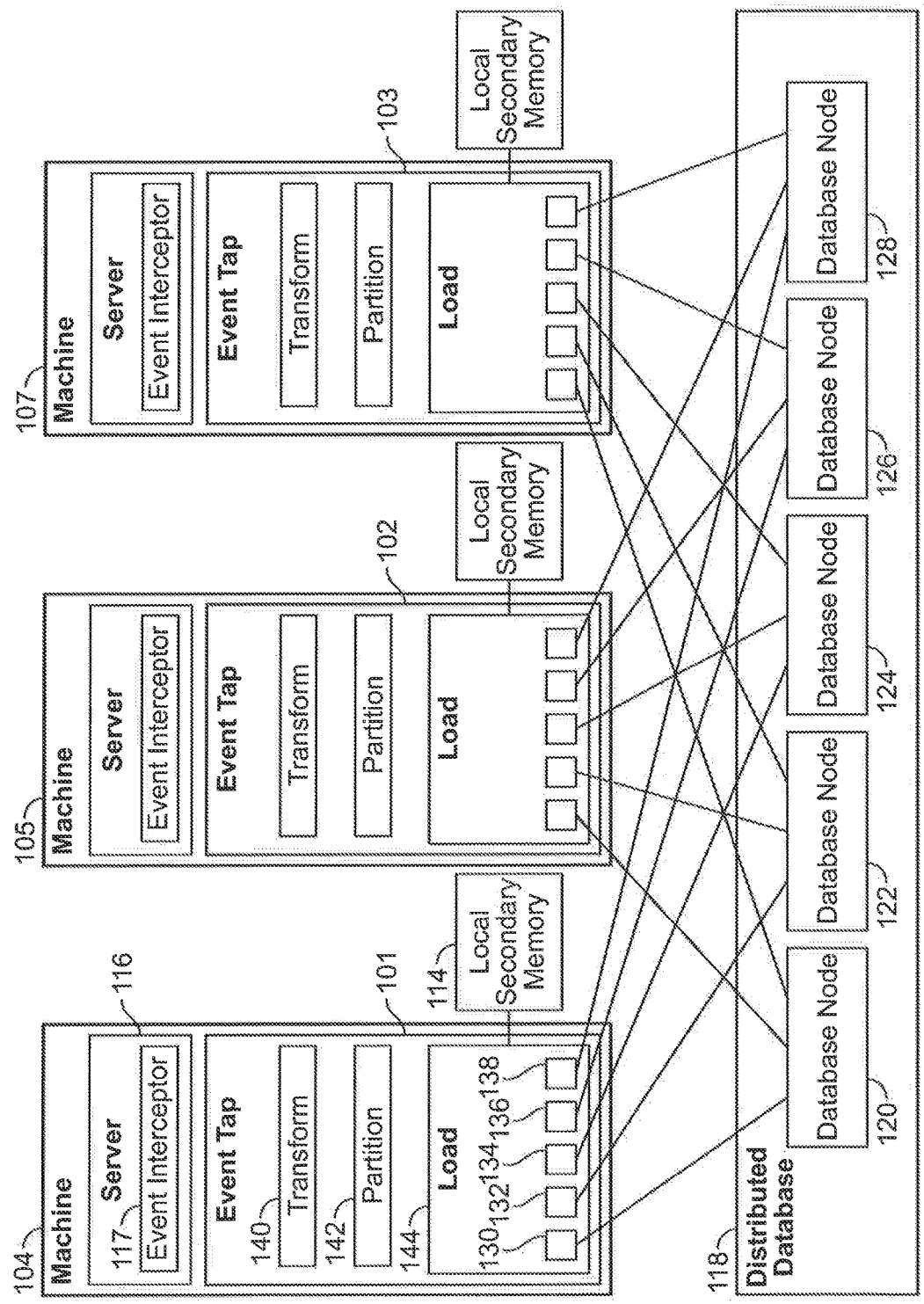
FIG. 1 is a diagram of one embodiment of an event tap of the present invention.

FIG. 1 shows an example of an event tap system of one embodiment. An event tap 101 can be located at a machine 104. The event tap 101 can transform an event, such as a Web server event, into a database representation, such as a tuple. An event can be any type of program event. For example, the events can be server events such as Web server events, application server events, or database server events. Exemplary Web server events can include the viewing of Web pages or other user interactions, such as downloading an audio or video clip.

The database representation, such as a tuple, can be of a format for storing in a database 118.

The database 118 can be a distributed database. In one embodiment, a distributed database 118 can be clustered. The distributed database 118 can use software such as Postgres-R or C-JDBC. In one example, a Beehive, produced by Aster Data Systems of Redwood City, Calif., can be used.

Loading events into a database 118 through a single point of entry does not scale, therefore methods can be used to assign tuples to database nodes 120, 122, 124, 126 and 128 directly. A tuple can be assigned to a specific database node. For example, information related to the tuple or server event can be hashed or used in another type of algorithm to produce an ID of the database node. The tuple can be placed in a queue 130 corresponding to that database node 120. In the example of FIG. 1, queue 130 is associated with database node 120, queue 132 is associated with database node 122, queue 134 is associated with database node 124, queue 136 is associated with database node 126, and queue 138 is associated with database node 128. In this way, the tuples can be distributed to the different database nodes 120, 122, 124, 126 and 128.

The queues 130, 132, 134. 136 and 138 can accumulate tuples for a certain period of time and then be sent to the respective database nodes 120, 122, 124, 126 and 128. In one embodiment, the period can be a minute or less. In one example, the period can be less than 30 seconds, In one embodiment, the period of time is not predetermined. Alternately, the flushing of queues can be triggered by any type of relevant event, such as the queue filling up to a predetermined level, for example 80%.

The queues 130, 132, 134, 136 and 138 can overflow to local storage 114 if a database node becomes unavailable. The local storage 114 can be any type of memory, such as a hard disk. On a failure of a database node, the tuples can be sent to another database node. For example, if database node 124 fails, the tuples that would be assigned to database node 124 can be reassigned to other database nodes such as one or more of database nodes 120, 122, 126 and 128. The database 118, or other software, can keep track of where tuples are stored, The server 116, such as a Web server, can have an event interceptor 117 to provide the events to the event tap 101. The event tap 101 can be comprised of software elements to process the events for the database 118. The event tap 101 can include a transform stage 140 to transform events intercepted by event interceptor into a database representation, such as a tuple. Partition stage 142 can determine which database node should receive the database representation. Load stage 144 can store the database representations into queues 130, 132, 134, 136 and 138 and load batches of the database representations to the database nodes 120, 122, 124, 126 and 128 at the appropriate time.

The event tap can be on one or multiple machines. For example, different stages of the event tap can be on different machines.

In one example, the load stage 114 could reside on a separate server on the same Local Area Network (LAN) as the server. This separate load stage can be running on hardware customized for the application (rather than for the server). The separate load stage can also aggregate data from the multiple servers, thus leading to a hierarchical system. The network bandwidth between Web servers and external load stage servers may be high, whereas the bandwidth between load stage servers and database might be low (thus, the load stage servers can act as an aggregator).

FIG. 1 shows multiple machines 104, 105, 107 that contain event taps 101, 102, and 103 associated with a distributed database 118. In some embodiments, a large number of servers can be associated with the distributed database 118.

Figure 2A:
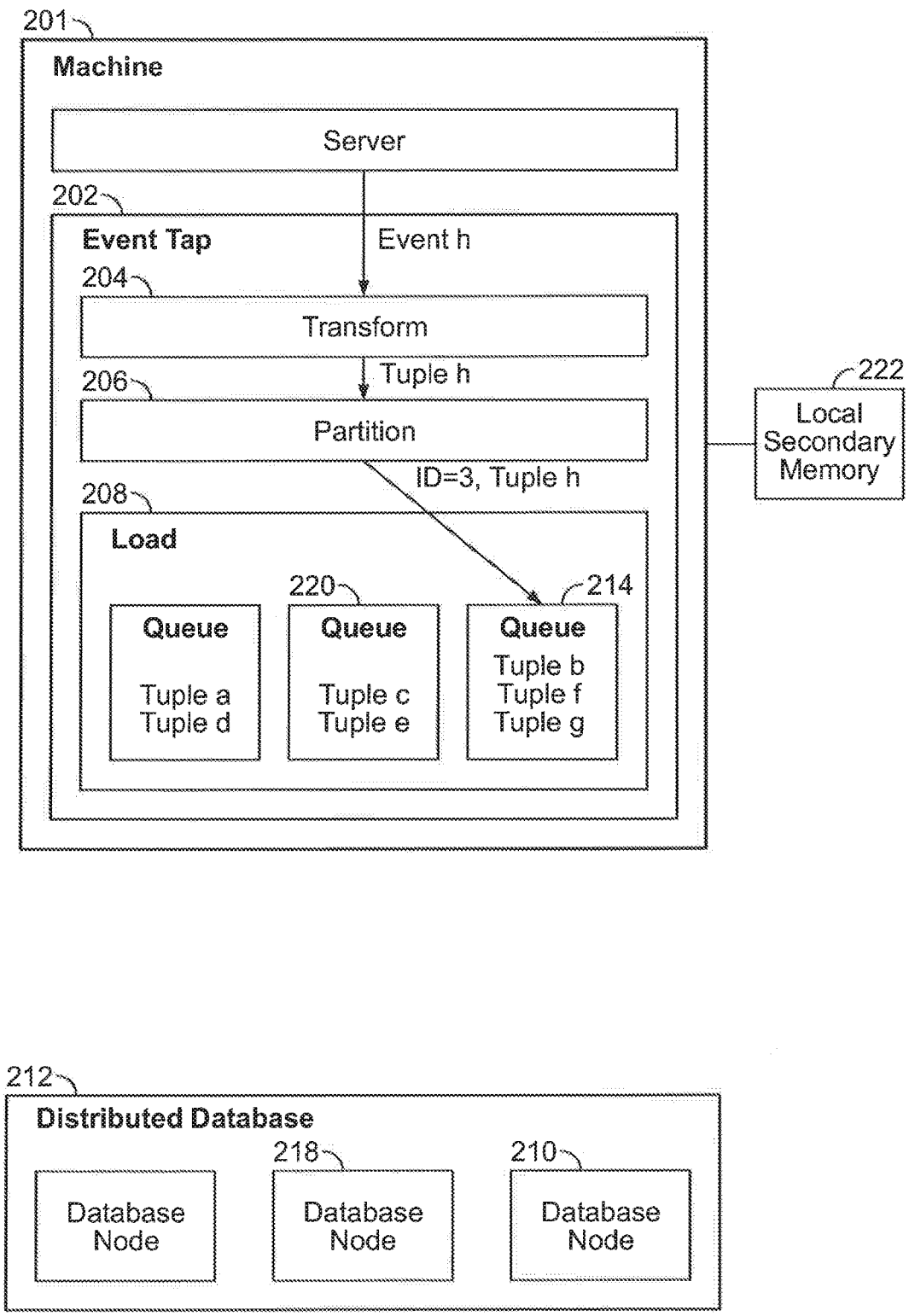
FIGS. 2A-2D are diagrams of examples of the operation of an embodiment of the present invention.

FIGS. 2A-2D illustrates examples of the operation of embodiments of the present invention In the example of FIG. 2A, the event tap 202 receives an "event h". Transform stage 204 converts the "event h" into a database representation tuple h". Partition stage 206 determines the database node (and queue in load stage 208) for database representation "tuple h". In this case, 'tuple h" is destined for database node 210 in database 212, and so is queued in queue 214 of load stage 208.

Figure 2B:
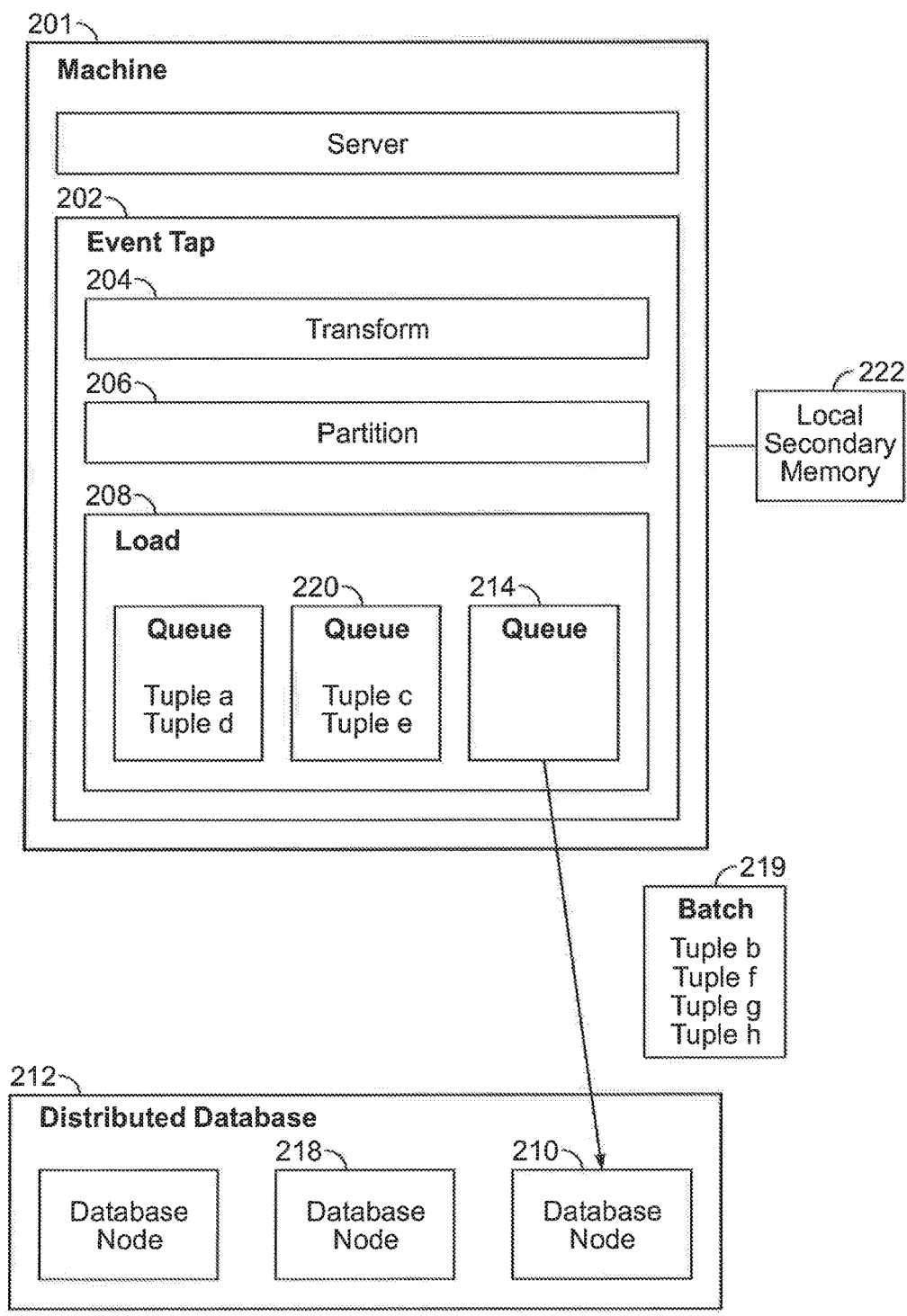

In the example of FIG. 2B, a batch 219 of database representations (including "tuple h) is sent from queue 214 to database node 210. The batching of the transfers to the database nodes reduces the number of update transactions the database must perform (reduction is according to the hatching factor, and can be as arbitrarily high (e.g., 1,000× or even 10,000×) and thus can help the system scale for use with very large server farms. The queues of the load stages can transfer batches in a staggered manner so that the tuple loads are spread out over time and database 212 is not overloaded with operations/transactions at any given time.

Figure 2C:
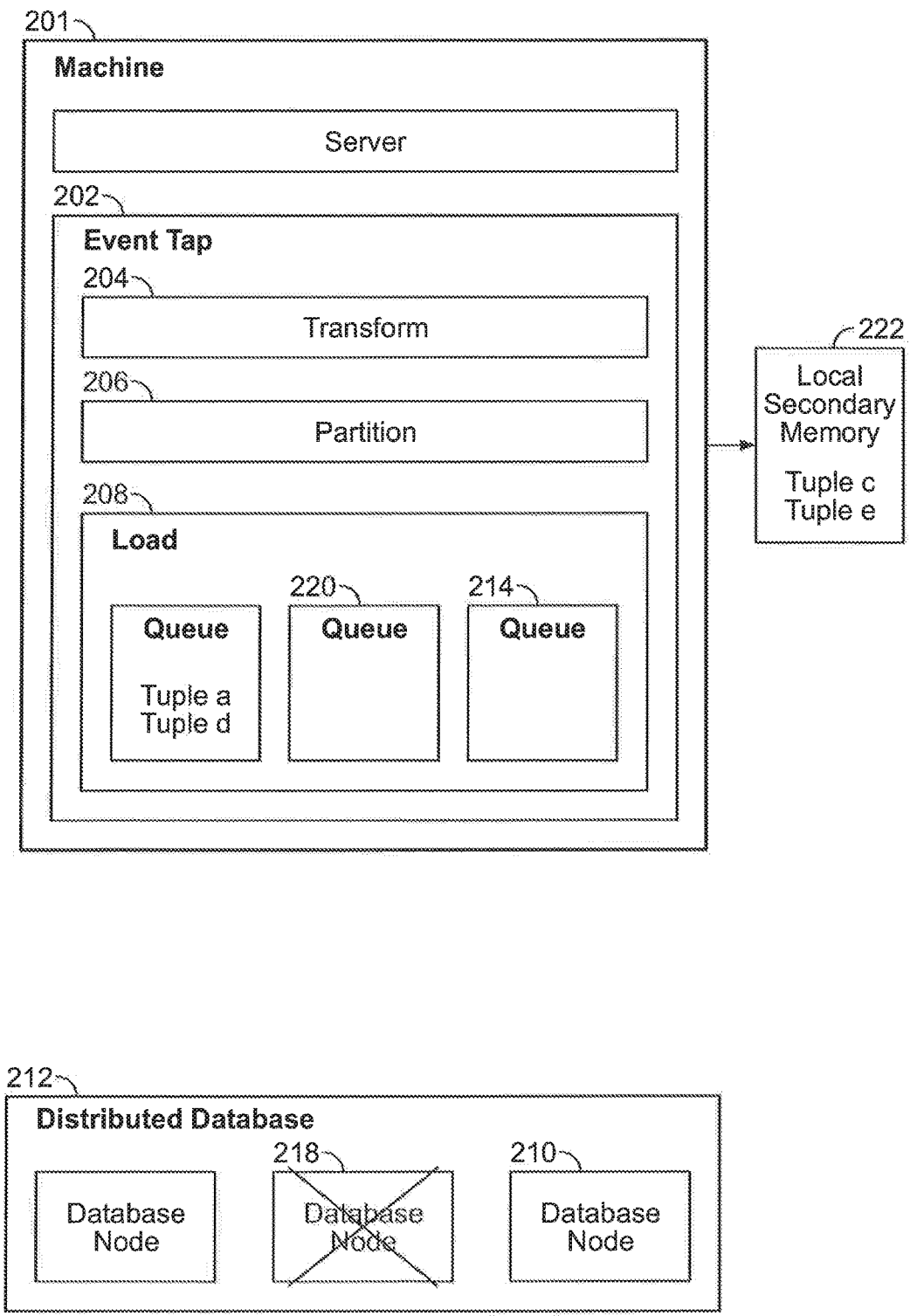

FIG. 2C shows an example after database node 218 goes down. This event can be detected by noticing the termination of the Transmission Control Protocol (TCP) connection between the load stage and the database node or a variety of other techniques. The load stage at each server can then periodically attempt to reestablish the connection with the failed database node. In the meantime, database representations from queue 220 can be sent to local storage 222. This prevents these database representations from being lost if machine 201 fails.

Figure 2D:
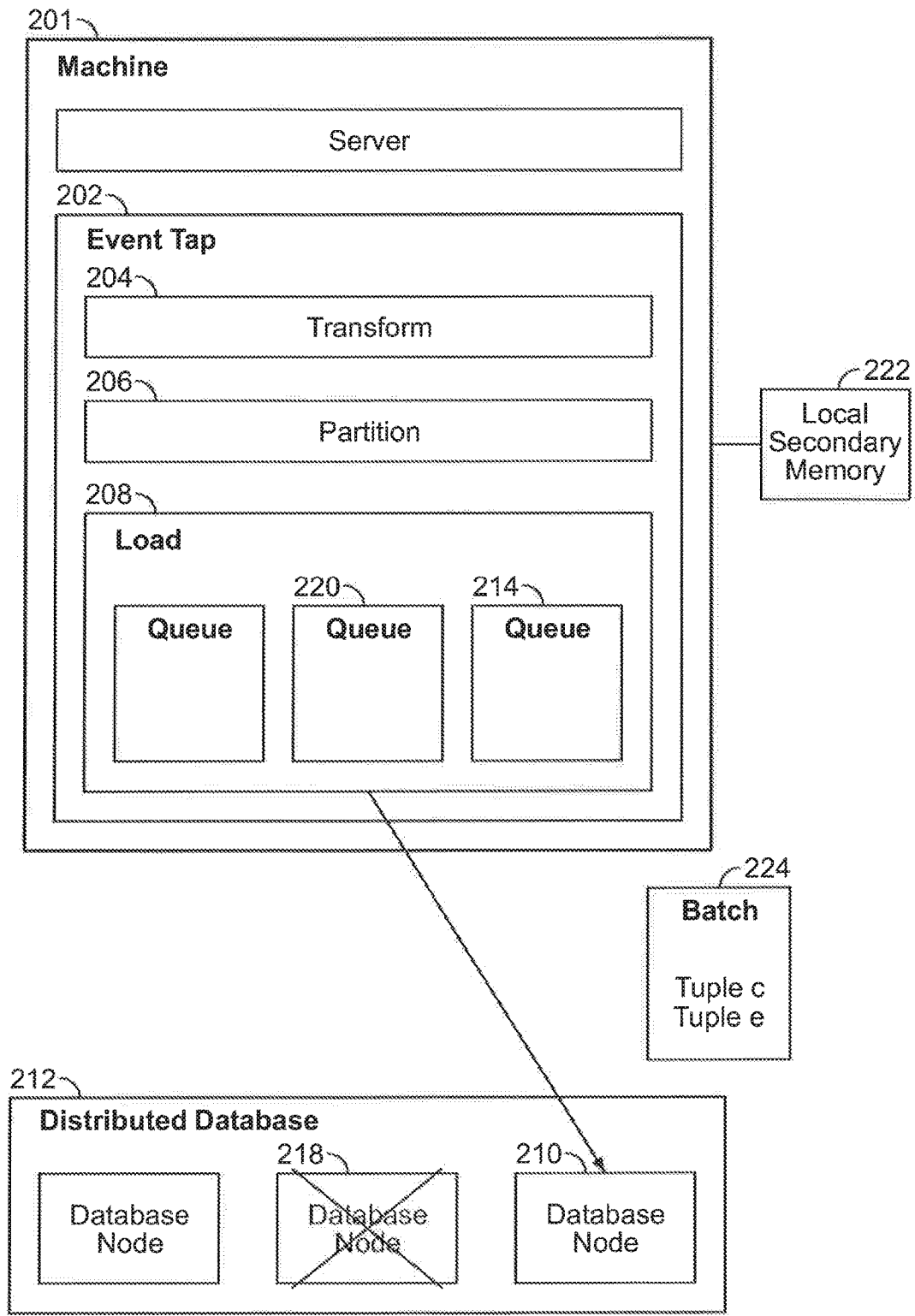

FIG. 2D shows an example where if database node 218 remains down for a period of time, the database representation that would otherwise be stored in database node 218 can be stored in another database node. In this example, batch 224 is sent to database node 210 rather than database node 218. This batch could be retrieved from local secondary memory or from main memory.

Figure 3:
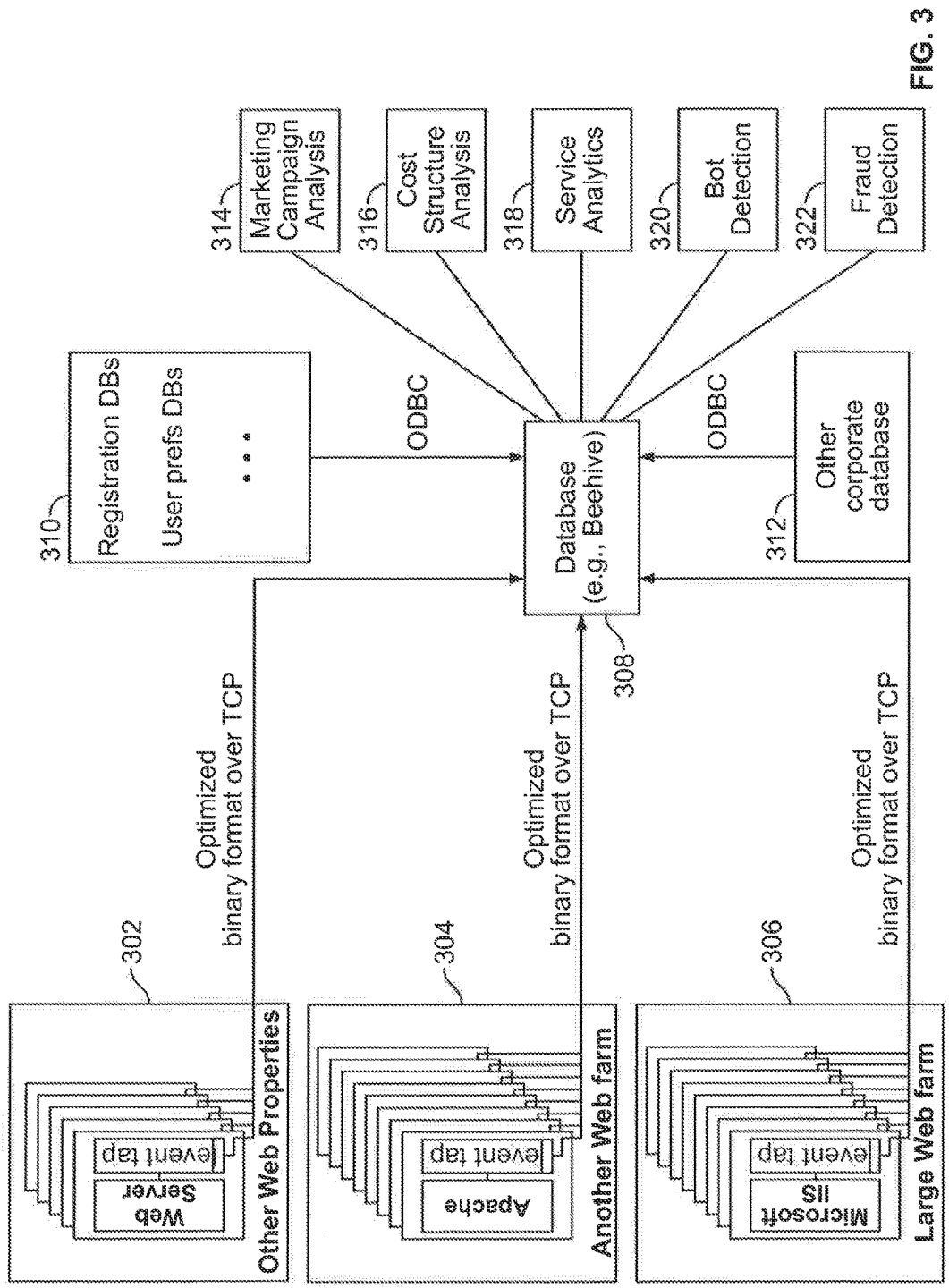
FIG. 3 is a diagram of a system using an event tap of one embodiment of the present invention.

FIG. 3 shows an overview of a system that can use event taps of the present invention. A number of Web server locations 302, 304 and 306 can send the tuples to database nodes in the database 308. The information in database 308 can be associated with data in additional databases 310 and 312.

A number of functions can use the stored data. They can include market campaign analysis 314, cost structure analysis 316, service analytics 318, bot detection 302, and fraud detection 322. The functions can use SQL or some other query language to make use of the stored event data.

A single, central repository for all data used in analytics can be used, such as a Beehive, produced by Aster Data Systems of Redwood City, Calif. Event data can be captured from live systems (such as Web servers); additional data can be uploaded via standard mechanisms (such as Open Database Connectivity (ODBC)) from other databases.

Described below is one detailed example of the capture, transformation, partition, and loading of data from live Web servers (Microsoft Internet Information Services™ (IIS™) in this example). The same model can carry over to other types of live systems in which events occur at a very high rate (like RID scanning devices in a warehouse, etc.)

The design described can maximize the efficiency of data extraction and transformation in a way that leverages the resource availability at typical large-scale Internet services: direct extraction of the events from the Web servers, transformation into database tuples on the fly, and direct insertion into database nodes, such as Beehive worker nodes. This can be referred to as intravenous loading since events can go straight to the database.

There can be four distinct phases in this process;
1. Extraction of event information;
2. Transformation of the events into database tuples;
3. Deciding where within the database to place these tuples (e.g., in the case of Beehive, which worker node to place the ample on);
4. Loading of the tuples in the corresponding location(s).

The first step can be implemented in an event interceptor that resides within the Web server program.

The purpose of the event interceptor can be to capture request/response events in the Web server and relay them to the event tap. The event tap can reside on the Web server hardware or an external hardware; the individual stages of the event tap can also be split so as to reside on different hardware. For this example, it is assumed that the entire business application runs in ASP.NET on the Web server.

The event interceptor for IIS™ 6.0 can be an Internet Server Application Programming Interface (ISAPI) filter deployed in the IIS™ Web server, It can run within the Web server process or outside the server process; as such, its functionality can be kept to a minimum to ensure robustness.

The interceptor can be activated every time an HTTP (or HTTPS) request is received by IIS™, as well as when the response is sent back to the user. The event interceptor can therefore see every HTTP (or HTTPS) request, not just individual user clicks (one click can result in a large number of HTTP/HTTPS requests, as the browser fetches the various elements that constitute the displayed HTML page).

ISAPI is an API for the IIS™ Web server that allows programmers to develop Web-based applications that run faster than conventional Common Gateway Interface (CGI) programs. IIS™ exposes a set of notifications (events) that ISAPI filters can register for; when IIS™ triggers such notifications, the ISAPI filter dynamic link library (DLL) is invoked (callback style). In IIS6™, ISAPI filters run outside the IIS™ process, so they can't crash it.

A filter can get activated upon a request receipt/response. There are several types of input the event interceptor can use including: server variables, response parameters, application-specific fields, and cookies.

For server variables, ISAPI filters can call GetServerVariable and read information needed about the request.

The following information about the incoming request can be extracted using this mechanism (other fields can be accessed as well, as required by the application):
  Referrer (HTTP_REFERER variable): URL of the page that referred the request to the current page using an HTML <A> tag
  User agent (HTTPUSERAGENT variable): describes the type of browser that sent the request
  Client IP address (REMOTE_ADDR variable)
  HTTP method (REQUEST_METHOD variable): one of GET, HEAD.
  POST, etc.
  Uniform Resource Identifier (URI) stem (URL variable): base portion of the Uniform Resource Locator (URL), without any querystring or extra path information, e.g., /index.cfm
  FuseAction (or other way to identify a method)+Parameters (QUERY_STRING variable): URL portion that follows the question mark, e.g., fuseaction=login process&MyToken=<.>

FuseAction is used by the Macromedia ColdFusion application server. This can be an alternative to implementing the entire application in ASP.NET ISAPI filters can receive notification immediately prior to the Web server sending the response headers to the client. The filters can then inspect, modify, or add headers that the client receives as part of the response to the client's original request.

The ISAPI filter can register for the SF_NOTIFY_LOG event and extract the following fields from the HTTP response:
  HTTP status (dwHttp Status field): the return code sent to the user
  Processing time (msTimeForProcessing field): time in milliseconds required to process the client request The business application can communicate with the event tap by passing it the custom values, so the application can instruct the tap what to write into the database. For example, for application specific fields, the business application tier (such as ASP.NET or ColdFusion) can pass custom values to the interceptor, through custom HTTP headers: the application can set the header to a value, and then the ISAPI filter can extract this custom header (via the HTTP_<HeaderName> variable). After extracting this header, the ISAPI filter can discard it from the response, so it is not received by end users. Through this mechanism, we can obtain the following fields:
  User ID (in the HTTP_CUSTOM_USERID header field)
  User type (in the H P_CUSTOM_USERTYPE header field)

Cookies can provide another way to obtain information; there may be a number of cookies that are of interest to the event interceptor (the cookie is extracted using GetServerVariable): COOKIE A and COOKIE B.

Each individual event can be relayed to the event tap using a FIFO (First In, First Out) Inter-Process Communication (IPC) mechanism. On Windows, there are at least 3 choices: mailslots, named pipes, and sockets. The choice of mechanism can depend largely on the customers preferences. Regular Berkeley style sockets (through the Winsock interface) can allow the interceptor code to be platform independent thus being portable to UNIX based platforms using Apache or similar Web servers. Another embodiment for an Apache server can use the Apache module system.

The event interceptor need not have any configuration file, as the names of the fields to be extracted can be hardcoded in the event interceptor. The code can then be updated whenever new fields need to be extracted using the methods described above. While this may appear to be cumbersome, it is roughly equivalent in effort to updating a configuration file and distributing it to the Web servers.

In one embodiment, a configuration file with a few parameters, such as which server variables to extract, which fields of the cookies to extract, etc., can also be used.

Two mechanisms can be used for detecting the failure of the interceptor: IIS™ itself and the metrics collected from the event tap. The interceptor itself need not perform any detection.

The interceptor can be replaced or restarted along with IIS™, when this is required.

Updates to the filter can be pushed out in the same manner in which Web server configuration changes are pushed out.

The event tap can be a daemon (service on Windows) whose purpose is to drain a queue of events arriving from an extraction interceptor (as described in the previous section). In a typical deployment, this daemon/service can be part of the standard Web server installation; this service can be running at all times on every Web server.

The general function of the event tap can be to perform:
Transformation of event data;
Partitioning; and
Loading of the events into one or more Beehive workers.
The functions can be performed in the same process.

The event tap can receive information about each HTTP event as it occurs, encapsulated in an HttpEvent structure. It can then decide to which worker the incoming HttpEvents must go, batch them up, and periodically load the batches into the database workers nodes.

Processing within the event tap can occur in three stages:
1. Transformation of event data into tuples.
2. Partitioning of the tuples across the space of Beehive workers.
3. Loading of the tuples into the requisite workers, The transformation stage can turn an HttpEvent into a Tuple.

There need be no explicit. API to the event tap. Since it is a daemon, it can be pulling its own input from the FIFO queue where the event interceptor deposits it.

Upon startup, the event tap service can open a FIFO listening endpoint and receive events in this FIFO.

The daemon/service can read from the FIFO in a non-blocking manner. If, for some reason, the FIFO disappears, it can reestablish the FIFO and wait for the interceptor to reconnect. Note that the event tap need not restart Web servers in order to restart interceptors.

The general structure of the transformation mapping can be:

```
<MAPPING>
    <FUSEACTION>action_1</FUSEACTION>
    <TRANSFORMATION>
        <FIELD>field_id</FIELD>
        <TABLE>table_name</TABLE>
        <COLUMN>column_name</COLUMN>
        <TYPE>data_type</TYPE>
        <PARTITION>string_hash</PARTITION>
    </TRANSFORMATION>
    <TRANSFORMATION>
        ...
    </TRANSFORMATION>
    ...
</MAPPING>
<MAPPING>
    <FUSEACTION>action_2</FUSEACTION>
    ...
</MAPPING>
<MAPPING>
    <FUSEACTION>none</FUSEACTION>
    ...
</MAPPING>
```

A mapping describes which fields of the HttpEvent to transform and how given the fuseAction (or other method identifier) associated with that event. If the HttpEvent carries no fuseAction, then the last segment (marked as "none" fuseAction) can be used to do the mapping. For the generic example shown above, if the fuseAction field of an incoming HttpEvent was action_1, then the transformer can generate a tuple that contains the field_id element of the HttpEvent in the position corresponding to column column name in table table_name, of type data type.

The transformation stage can directly invoke the Partition stage and pass it a Tuple object.

The partition state can decide where (for example, which database node worker as expressed through a workerid) to place a given triple. In one example, a simple hash of the workerid can be done.

The Partition stage can receive a Tuple object from the Transform stage.

This stage can use the partition information from the incoming Tuple to determine how to partition the data. Remember that the Transform stage sets this property for the attributes in the Tuple object based on the configuration file. For example, if we have

```
<MAPPING>
    <FUSEACTION>action</FUSEACTION>
    <TRANSFORMATION>
        <FIELD>sessionid</FIELD>
        <TABLE>facts_table</TABLE>
        <COLUMN>column_1</COLUMN>
        <TYPE>unsigned integer</TYPE>
    </TRANSFORMATION>
    <TRANSFORMATION>
        <FIELD>username</FIELD>
        <TABLE>table_X</TABLE>
        <COLUMN>column_2</COLUMN>
        <TYPE>varchar</TYPE>
        <PARTITION>string_hash</PARTITION>
    </TRANSFORMATION>
</MAPPING>
``` then the Transform stage could send a Triple to the Partition stage with two fields, one of which should be used for partitioning (column_2) and another that should not (column_1).

The Partitioner can perform the requisite computation and pass the resulting workerid along with the Tuple to the Load stage.

The algorithm to determine how partitioning occurs (e.g., string hash above) can be a black box to the Transform stage. This algorithm can be provided externally. For one version of the Loader, hash-partitioning can be done; other versions can use more sophisticated partitioning algorithms, depending on query workload. On exemplary algorithm is given in U.S. Pat. No. 8,156,107, titled "SYSTEM AND METHOD FOR JOIN PARTITIONING FOR LOCAL COMPUTABILITY OF QUERY OVER SHARED-NOTHING CLUSTERS" by Bawa; Mayank Bawa, Anastasios Argyros, and George Candea, issued on Apr. 10, 2012, incorporated herein by reference.

The purpose of the loading stage can be to place batches of collected tuples into worker databases.

The load stage can
  receive tuples and groups them by destination (i.e., by workerid), batches them up, and periodically send the tuple batches to the appropriate worker;
  overflow to disk if any of the destination workers are temporarily unavailable;
  fail over to an alternate worker if the requisite worker does not come up in time.

Periodically, the tuple batches can be sent to workers using an open or proprietary library that is specific to the database. Alternatively, one could use open protocols, such as ODBC or JDBC. In one embodiment, once a transmission succeeds, a tuple batch is not used again.

The period of transmission can be chosen with a random distribution between 5 to 15 seconds; the uniform distribution ensures that loads do not synchronize to overload the workers.

There may be instances in which the destination worker is temporarily not available, in this case, the tuple batches can be written to local disk until the worker becomes available again. The Load stage can maintain a separate file for each table at each worker for these purposes.

On occasion, a worker node may be inaccessible for longer than it is intended to keep data at the Web server (e.g., 10 minutes). The effect of this longer inaccessibility is that many events may accumulate in the tap's queues (in memory and/or on disk) and exhaust available space, as well as the fresh data not being available in the database for analysis. In this case, the Load stage can failover the loading to another worker or a set of workers. In the simplest case, the insertion of tuples can be done to the ((workerid+1) mod n)th worker, where n is the number of total workers; if that worker is not available, then the ((workerid+2) mod n)th worker can be used and so on. The tuples can also be distributed uniformly across all the available workers.

The failedover batches can be written to specially named child tables of the target relations. This allows for easy subsequent identification (with a simple SQL query) and wholesale movement to the proper worker node, once that node recovers, If a customer chooses to trade some CPU cycles for network bandwidth, then it is possible for the Loader component to compress the tuple batches. With freely available compression, a seven to ten reduction in size can be achieved which results in a corresponding reduction in network bandwidth utilization; with custom application-specific methods, compression rations as high as 300× can be achieved. On the receiving side, the data can then be decompressed and inserted into the database.

There are two external side effects for the load stage: tuple batches are written to the DB on the worker nodes; overflow data is written to the Web server's disk.

Disk space can be suitably managed, to ensure proper coexistence with all the other applications running on the same host (most notably IIS™). If running low on disk, the failover algorithm described above can trigger sooner than the timebased threshold.

An exemplary configuration file can be of the form:

```
<CONFIG> <MIN_WORKER_IP>10.0.4.1</MIN_WORKER_JP>
<MAX_WORKER_IP> 10.0.4.26</MAX_WORKER_IP>
<DB_NAME>Beehive</DB_NAME>
<DB_USER>aster</DB_USER>
<FAILOVER_POLICY>next_worker</FAILOVER_POLICY>
<MIN_XMIT_PERIOD_SEC>5</MIN_XMIT_PERIOD_SEC>
<MAX_XMIT_PERIOD_SEC>15</MAX_XMIT_PERIOD_SEC>
<HEARTBEAT_PERIOD>30</HEARTBEAT_P ER IOD>
</CONFIG>
<MAPPING>
...
</MAPPING>
```

The ISAPI filter, event tap, and configuration file can be deployed on the Preboot Execution Environment (PXE) boot server that is frequently used in large Web farms (for management reasons). Often, IIS™ is restarted by the Network Operations Center (NOC) every time new code is pushed. Whenever the configuration file is changed it can be pushed out to the Web servers via the customer's preferred mechanism (e.g., over CIF'S). The Load tap service can then be restarted remotely.

Changes to the configuration file can be infrequent.
  One such instance will be when new workers are added; in this case, the partitioning algorithm(s) can automatically take this information into account as well.
  Another instance is when schema changes are made. In this case, other changes can be pushed out as well (e.g., the interceptor may need to change, so it can collect new fields; the customer's application may need to export new fields to the interceptor; etc.)

Information about the status of the event taps and the progress of loading can be relayed to a central system manager or NOC over regular network connections; such periodic status updates can also count as liveness updates, assuring the human administrator that the system is running well and within parameters. In one embodiment, Logging and Monitoring information can be relayed to the system manager regarding the progress of loading; this can be implicitly a liveness update as well. In one embodiment, at least every 30 seconds, the event tap can provide information on:
  Seconds since last restart of the event tap
  Rows loaded successfully into workers since last restart
  Bytes loaded successfully into workers since last restart
  Rows currently held in local overflow file(s)
  Bytes currently held in local overflow file(s)

This information can be exposed to the NOC through a standard Web-based interface exported through a system management console.

The system can rely on an updated "seconds since last restart' field of the monitoring update to determine whether the service is up or down. If down, it can then be restarted.

In reaction to the service being down, it can be redeployed by pushing out a code change and restarting the service. Recovery of the event tap can be done via restart.

In one embodiment, the event tap is able to:
  keep up with the production of tuples from the interceptor
  absorb possible delays resulting from slow or failed workers Assuming 150 HTTP requests/sec to be an average serving rate per Web server with 1 KB of data collected per request, then each server produces 13 GB of event data per day, which can easily be accommodated on the Web servers local storage.

The event tap can be designed to sustain the production of 1,000 tuples/sec, corresponding to the peak load on the Web server, and insertion of such tuples into the worker DBs without needing to touch disk. Given that tuples are batched, latency is not a concern, as long as it does not exceed the application specific freshness requirements (e.g., on the order of minutes or hours for Web analytics).

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A computing system that includes one or more physical processors configured to:
   load event data representative of Web server events associated with one or more events captured as a result of use of one or more Web pages supported by the one or more Web servers, wherein the event data is in a raw form not readily suitable for directly storing and processing by a distributed database system that includes multiple nodes operable to each independently store and process data for the database system;
   transform the event data from the raw form into a database representation format of the event data for storage and processing by the database system; and
   distribute the database representation format between the multiple nodes of the distributed database system, wherein the distributing of the database representation format of the event data comprises:
      arranging at least a first portion of the database representation format of the event data for delivery to a first node of the multiple nodes;
      arranging at least a second portion of the database representation format of the event data for delivery to a second node of the multiple nodes;
      delivering the first portion of the database representation format of the event data to the first node of the multiple nodes;
      delivering the second portion of the database representation format of the event data to the second node of the multiple nodes;
      storing and processing of the first portion of the database representation format of the event data by the first node of the multiple nodes; and
      storing and processing of the second portion of the database representation format of the event data by the second node of the multiple nodes.

2. The computing system of claim 1, wherein the loading of the event data comprises:
   loading of the event data by an event tap at the one or more Web servers.

3. The computing system of claim 1, wherein the transforming of the event data comprises:
   transforming the event data by an event tap at the one or more Web servers.

4. The computing system of claim 1, wherein the distributing of the event data comprises:
   distributing of the event data by an event tap at the one or more Web servers.

5. The computing system of claim 1, wherein the distributing of the database representation format between the multiple nodes of the distributed database system comprises:
   selecting one of the multiple nodes of the database system as one selected node selected to directly store and process at least one portion of the database representation format of the event data; and
   arranging the at least one portion of the database representation format for delivery to the selected one node for processing by the one selected node directly.

6. The computing system of claim 5, wherein the distributing of the database representation format between the multiple nodes of the distributed database system further comprises:
   selecting another of the multiple nodes of the database system as another selected node selected to directly store and process at least another portion of the database representation format of the event data; and
   arranging the other portion of the database representation format for delivery to the other selected node for processing by the other selected node directly.

7. The computing system of claim 6, wherein the arranging of the database representation of the event data for delivery to the selected node comprises storing the database representation in a queue for delivery to the selected node, wherein for each one of the nodes of the database system, a queue is arranged to store database representation of the event data for delivery for that queue.

8. The computing system of claim 7, wherein the queue is filled for a period of time before it is loaded to the selected node.

9. The computing system of claim 7, wherein the transforming the event data into a database representation transforms the event data into a tuple.

10. The computing system of claim 6, wherein the queue overflows to disk if the selected database node is unavailable.

11. The computing system of claim 6, wherein the database representation of the event data is arranged for delivery to another node of the database system when the selected node is or becomes unable to accept the transformed event data.

12. The computing system of claim 6, wherein an event interceptor on the server provides the event data.

13. The computing system of claim 6, wherein the events are web server events associated with providing of content to a user across the Internet.

* * * * *